United States Patent [19]

Bergvall

[11] Patent Number: 5,220,429
[45] Date of Patent: Jun. 15, 1993

[54] VISION SYSTEM FOR DETECTING A PICTURE AND REPRODUCING SAID PICTURE AS A PICTURE WITHIN A PICTURE

[75] Inventor: Bengt-Allan Bergvall, Huskvarna, Sweden

[73] Assignee: Saab Instruments Aktiebolag, Sweden

[21] Appl. No.: 864,693

[22] Filed: Apr. 8, 1992

Related U.S. Application Data

[63] Continuation-in-part of Ser. No. 753,021, Aug. 26, 1991, abandoned, which is a continuation of Ser. No. 457,699, Jan. 5, 1990, abandoned.

[30] Foreign Application Priority Data

Aug. 27, 1987 [SE] Sweden .................................. 8703315

[51] Int. Cl.5 ........................ H04N 5/262; H04N 7/18; H04N 3/30
[52] U.S. Cl. ...................................... 358/183; 358/93; 358/217
[58] Field of Search .................. 358/180, 183, 93, 217

[56] References Cited

U.S. PATENT DOCUMENTS

| | | | |
|---|---|---|---|
| 3,497,614 | 2/1970 | Petrocelli et al. | 358/217 |
| 3,654,386 | 4/1972 | Baum | 358/183 |
| 4,148,072 | 4/1979 | Vockenhuber | 358/224 |
| 4,199,785 | 4/1980 | McCullough et al. | 358/180 |
| 4,334,245 | 6/1982 | Michael | 358/180 |
| 4,589,029 | 5/1986 | Torimaru et al. | 358/224 |
| 4,651,200 | 3/1987 | Leadley | 358/93 |
| 4,673,973 | 6/1987 | Ledley | 358/93 |

FOREIGN PATENT DOCUMENTS 3146552 7/1983 Fed. Rep. of Germany .

Primary Examiner—John K. Peng
Attorney, Agent, or Firm—Lowe, Price, LeBlanc & Becker

[57] ABSTRACT

A vision system comprising a pair of camera devices movably mounted contiguous to one another at substantially the same distance from the object field to be reproduced. A first of such camera devices has a relatively large viewing angle of the object field while the second camera device has a smaller viewing angle of the object field within the first viewing angle. The camera devices are connected through electronic circuitry to a picture reproduction device for reproducing a first picture in response to the first camera device and a second picture in response to the second camera device wherein the second picture replaces a variable portion of the first picture corresponding to the second smaller viewing angle. The camera devices are movable by conventional servo mechanisms and the location of the smaller picture within the larger picture is adjustable. The picture reproduction device may constitute a cathode-ray tube.

7 Claims, 4 Drawing Sheets

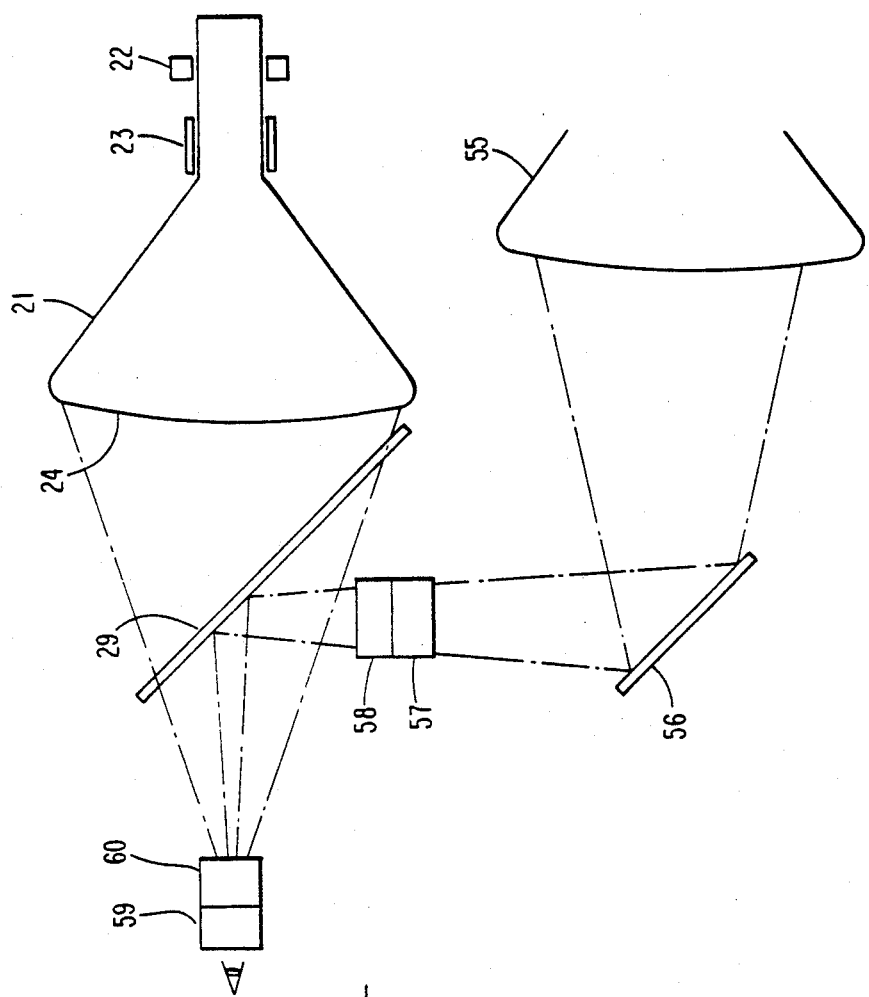
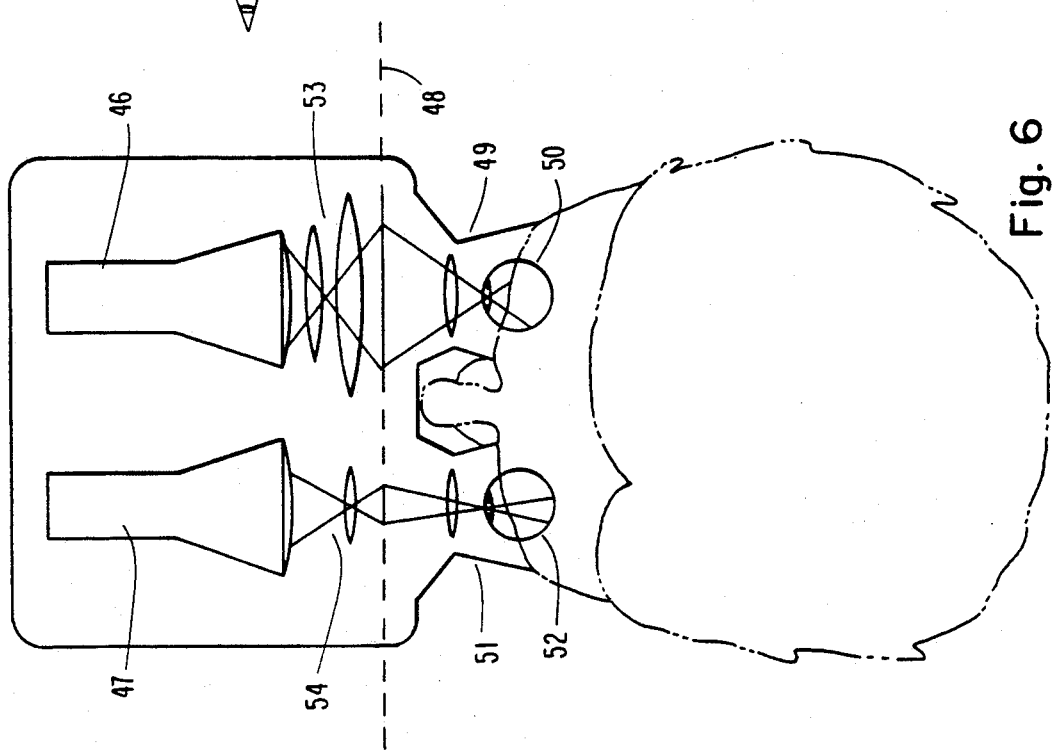
Fig. 7
Fig. 6

VISION SYSTEM FOR DETECTING A PICTURE AND REPRODUCING SAID PICTURE AS A PICTURE WITHIN A PICTURE

This application is a continuation-in-part of application Ser. No. 07/753,021, filed Aug. 26, 1991, which is a continuation of Ser. No. 07/457,699 filed Jan. 5, 1990, both now abandoned.

The present invention relates to a vision system comprising a picture capture device with at least a first camera and a second camera means, each of which camera means comprises an optical means and an electro-optical detection means (for example conventional vidicons), further comprising a picture reproduction device (such as a CRT or TV video tube), arranged to simultaneously reproduce pictures from the camera means in at least one display field.

Such vision systems permit a large distance between the picture capture device or camera assembly and the picture reproduction device or video monitor, where there are one or several viewers or observers. Current public television broadcasts are an extreme example of this situation. Also in other situations where the distance is smaller, there is a need to place a picture capture or camera device and picture reproduction display device, i.e., the observer, at desired locations, e.g., concerning television for traffic supervision, submarine periscopes and mast-mounted helicopter sights.

Such vision systems have certain disadvantages. Camera means of the kind mentioned above, i.e., such that are equipped with electro-optical detection means, have limited resolution capability. That capability can be defined as the detectable angle in a detector plane. Electro-optical detection means can be of different types. There are, e.g. detection means comprising a number of discrete photoelectric semi-conductor elements. In this case the detectable angle can be calculated, expressed in radians, as the separation, i.e., the distance between the center of two adjoining semi-conductor elements divided by the focal length in the optical means of the camera means. Also electro-optic detection means with continuous detection surfaces such as vidicons, have limitations in resolution capability, depending on which method of line scanning is used for the vidicons, and on the limited band width in the corresponding emitted signal.

The detectable angle in an ordinary human eye, depending on the separation between the detector elements rods and cones, is about 150 $\mu R$ in the yellow spot, i.e., the part of the retina of the eye with the least separation between rods and cones. In direct optical vision systems, such as field glasses, the optics can be constructed with such precision that this detectable angle can be utilized, i.e., the separation between the detector elements of the eye constitutes the limiting factor. If, e.g., the ocular in such a direct optical vision system is designated with an optical angle of 60°, the quotient is about 7× larger than the corresponding quotient for a camera device of the type mentioned above. Such a camera means will therefore give 7× inferior resolution at the same optical angle as a direct optic vision system. A middle course is to let the optic angle and resolution of the camera device be smaller than the corresponding data in a direct optical vision system.

The separation between the detector elements rods and cones that exists in the yellow spot of the eye is limited to the yellow spot. The separation increases with increasing optic angle relative to the center of the yellow spot according to the following table:

| Optic angle relative to yellow spot° | The separation of the eye rods - cones $\mu R$ |
| --- | --- |
| 0 | 150 |
| 5 | 500 |
| 10 | 1,000 |
| 15 | 1,500 |

One can say that the eye has a primary field of view with a good resolution, and a secondary field of view with lesser resolution. The cross-over between the two fields of view is not clear-cut but in practice an optic angle of 5–8 degrees may be considered the boundary. The eye has the great advantage that it can be directed towards the part of the field of view of special interest. That part of the field of view is focused on the center of the yellow spot, where the resolution is the best.

The object of the present invention is to provide a vision system of the type described above that allows the resolution of an observer's eye to be utilized.

According to the invention such a vision system is characterized primarily in that a first camera device is arranged to register a first picture with a relatively large first viewing angle of an object field, whereas the second camera device is arranged to register a second picture with a smaller second viewing angle within said first viewing angle of said object field, the picture reproduction device being arranged to reproduce the first picture, the second picture replacing to an optional degree that part of the first picture which corresponds to said second viewing angle, whereby the first and second viewing angles have the same relative direction to the object field as in the pictures reproduced by the picture reproduction or display device, whereby the relationship object field extension/picture reproduction extension is the same for the first and the second pictures. By viewing angle is here means the angle of the picture in azimuth as well as in elevation.

In most cases it might be desirable to let the second picture appear without the corresponding part of the first picture showing with any appreciable intensity of light, even though such cases are also conceivable.

In a preferred embodiment of the vision system according to the invention the first camera device is controllable in direction, either manually or via a first servo means, which would be the most appropriate if the invention is to be fully utilized. Servo devices for remotely directing or aiming cameras or guns are readily available and well understood by those skilled in the art. Such servo mechanisms to remotely control or aim one or both of the camera devices may be of the conventional closed loop control type capable of producing a controlled output motion at a high energy or power level in response to a low energy level input or control signal. A diagram and full description of the basic construction and operation of such servo mechanisms is found in McGraw-Hill Encyclopedia of Science and Technology, 1960, 1966, Vol. 12, pp. 198–206. Devices of this type may be obtained, by way of example, from Control Technology Co., Inc. of Long Island City, N.Y., or T S. Products, Inc. of Arleta, Calif. Suitable devices of this type are also shown in issued U.S. Patents in Class 318, Subclasses 560–695, Positional Servosystems, and Class 364, Subclasses 167–194, Numerical or Digital Positioning Systems. The second camera device can be fixed relative to the first camera device, in that case suitably directed toward the center of the viewing angle of the first camera device, i.e., the first viewing angle. In an advantageous embodiment, the second camera device is, however controlled in directions, suitably by means of a second servo mechanism, relative to the first camera device, so that the second viewing angle can be chosen anywhere within the first viewing angle.

The picture reproduction or display device can be designed in many ways within the scope of the invention. It comprises some kind of a picture reproducing means comprising, e.g., cathode-ray tubes, usually with magnetic deflection, or display windows containing liquid crystals or using electro-luminescence. In one embodiment the picture reproduction device comprises a first picture producing device arranged to reproduce said first picture from a first camera device and a second picture producing device arranged to reproduce said second picture from a second camera device, and comprises further a mirror arranged in front of the first picture producing device reflecting the second picture from the second picture producing device.

Such a picture reproduction display or device can be constructed in different ways. If the mirror is opaque, the second picture producing device and the mirror can be fixed relative to the first picture producing device, the mirror usually covering a center section of the first picture. The mirror may in a suitable embodiment be set at an angle of 45° to the display direction of the second picture producing device both of which display directions thereby forming right angles to each other. It is also conceivable that the mirror and the second picture producing device, fixed relative to each other, are movable, so that the second picture can be optically positioned within the first picture.

Another possibility is to make the mirror semi-opaque, covering the whole first picture, whereby only the second picture producing device need be movably arranged, if it is desired to have an optional covering of the first picture.

An additional embodiment of the picture reproduction devices involves the use of a single cathode-ray tube as a picture producing device. In it a signal processing device and an electron-beam generator in the cathode-ray tube are arranged to alternately show the first and second picture, respectively, in such a manner that an observer due to the persistence of vision registers the picture simultaneously.

In another embodiment of the vision system according to the invention the picture reproduction device comprises electronic means arranged to combine signals produced by the first and second camera device into at least one combined signal for producing a combined picture on the display field.

The picture reproduction device can also be so designed that the first and second pictures are reproduced on a display field in the form of a visual picture plane, in which they are separately observable by both eyes of an observer in such a manner that the pictures seem to the observer to coincide due to integration in the observer's brain the invention will now be described in more detail with reference to the accompanying drawings, in which.

Figure 5:
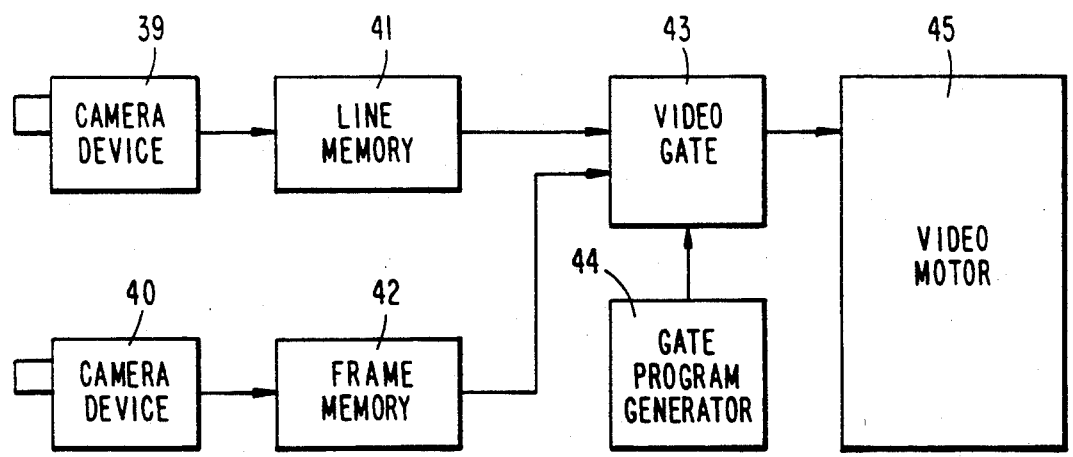

FIG. 5 shows a block diagram of an embodiment of the vision system according to the invention with electronic integration of the first and second pictures; whereas FIG. 6 shows diagrammatically a plan view of an embodiment of the vision system according to the invention with integration of the first and second pictures in an observer's brain; and FIG. 7 shows diagrammatically a plan view of the picture reproduction device in a still further alternative embodiment of the vision system according to the invention.

Figure 1:
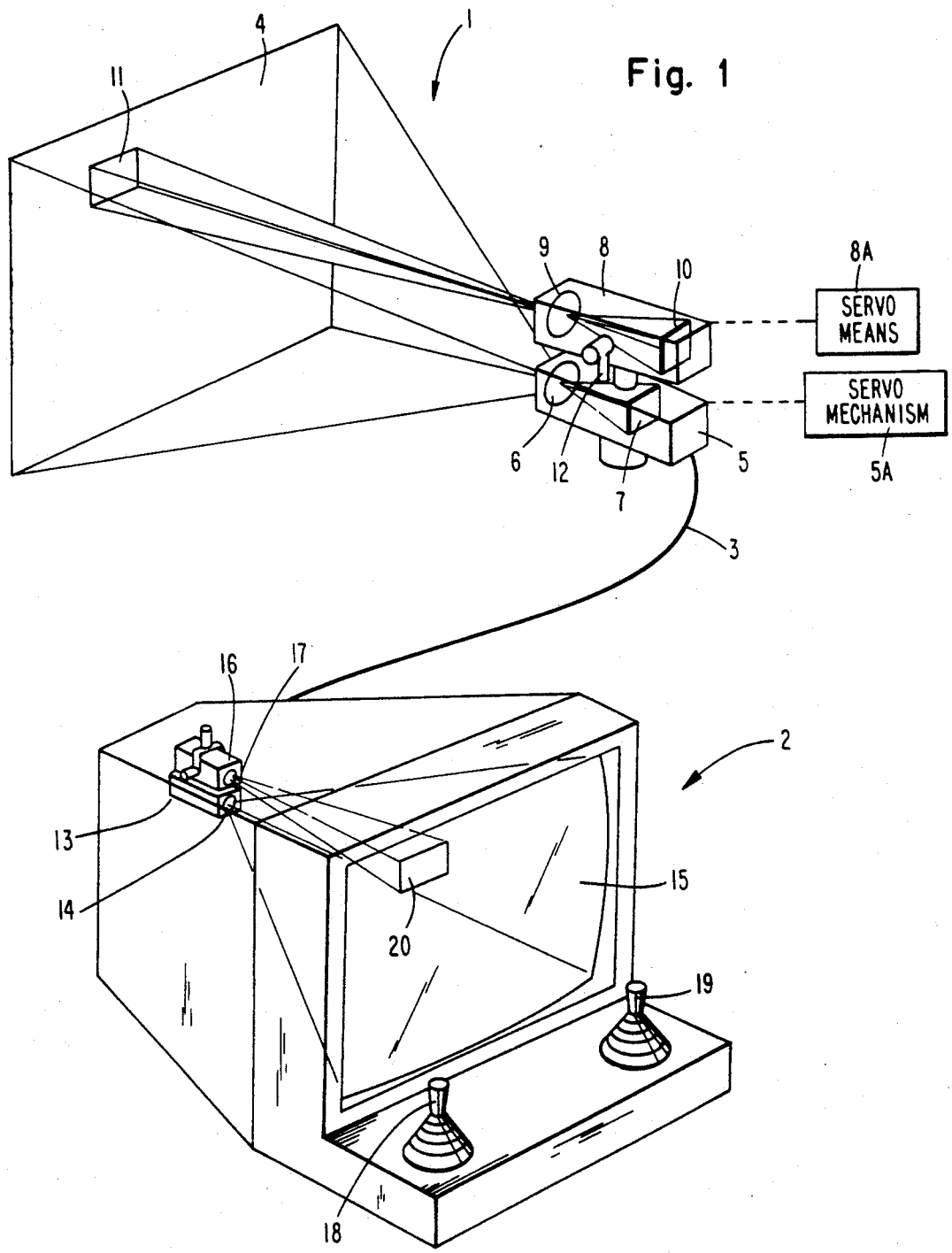
FIG. 1 shows diagrammatically a perspective view of a vision system according to the invention.

In FIG. 1 is a vision system shown comprising a picture capture device 1 and a picture reproduction device or display 2 that are connected by an electric cable 3. The picture capture device is directed towards an object field 4, which may be, e.g., a section of terrain or the like. A first camera device 5 comprises a first optical means or lens 6, which is not shown in detail, and a first detection means 7 consisting of a focal plane with a large number of discrete photo-electric semi-conductor elements arranged in two dimensions. The first camera means 5 is mounted as to be direction controlled in elevation and azimuth via a suitable servo mechanism indicated diagrammatically at 5A. The servo means are remotely controlled, in this case from the site of the picture reproduction device 2. Said first optical means 6 has an optic angle such that the object field 4 can be observed with the viewing angle of the first camera means 5, i.e., said first viewing angle. As the first camera means is direction controlled, it can naturally be directed towards other object fields, not shown here. A second camera device 8 comprises a second optical means or lens 9, which is not shown in detail, and a second detection means 10, which is similar to the detection means 7. The focal length in the optical means 9 is in that case about 10× the focal length in the first optical means 6, whereby the viewing angle of the second camera device, i.e., the second viewing angle, will be smaller, to a corresponding degree, than the first viewing angle, and the second camera device can only observe a part section 11 of the object field 4. The second camera device 8 is mounted so as to be directably controlled in elevation and azimuth by means of a conventional servo means shown diagrammatically at 8A through a support 12, attached to the first camera device 5. Also the last mentioned servo means are remotely controlled from the site of the picture reproduction or display device 2.

The picture reproduction device 2 comprises a first picture producing means 13 that comprises cathode ray tubes, here not shown in detail, and a third optical means or lens means 14. That first picture producing means 13 is fixed relative to a frosted glass screen 15. A second picture producing means 16 is direction controlled in elevation and azimuth relative to the first picture producing means 13, and have cathode ray tubes, not shown in detail here and a fourth optical means or lens 17. The fourth optical means 17 has about 10× the focal length of the third optical system. The first camera device 5 is directable through a first joy stick 18, which in a manner acts upon the servo mechanism 5A that controls the first camera device. The second camera device 8 and similarly, the second picture producing device 16 are activated via their servo means, not shown in detail, by a second joy stick 19. The part section 11 in the object field 4 corresponds to a part picture 20 on the frosted glass screen 15. On observing a chosen object field 4 the observer can thus choose a partial section 11 which is reproduced by a partial picture 20 within the picture of the whole object field 4 that is reproduced on the frosted glass screen 15. The vision system comprises such a signal processing means, not shown, which via the cable 3 receives signals from the two camera devices 5 and 8 and via the picture producing means 13 and 16 display the desired picture on the frosted glass screen 15. The signal processing means is thereby arranged so as to vary the strength of the signals from the respective camera devices to weaken or totally exclude that part of the picture produced in the first picture producing means which is occupied by the partial picture 20, so that the latter can be observed with the improved sharpness in as much detail as permitted by the second and fourth optical means 9 and 17. It will be seen that the objects in the object field, i.e., the actual objects under view, are reproduced in the picture on the same scale by both camera devices. The second or smaller picture is reproduced sharper than the larger picture because the second camera has only to cover a smaller viewing angle compared with the first camera. By way of example, the first camera device 5 may be a Panasonic Video Camera WV-CD 132, with a Cosmicar Objective C6Z 1218, Zoom 12-75 mm. The second camera device 8 may also be a Panasonic Video Camera WV-CD 132, with a Rodenstock Objective Rodagon 5.6/150 mm.

Figure 2:
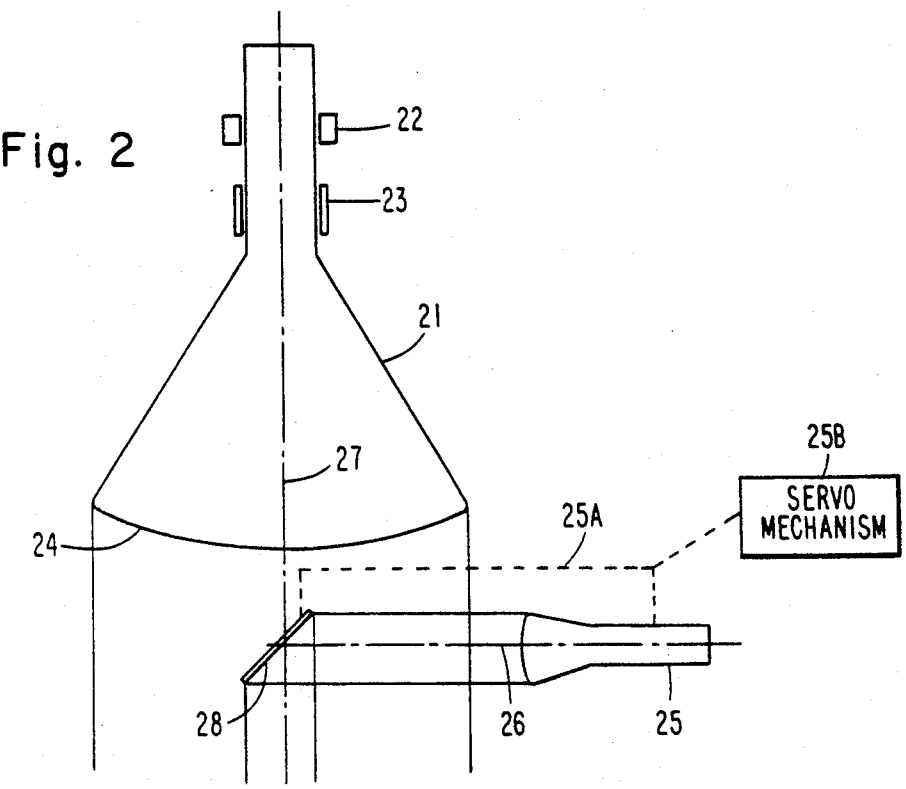
FIG. 2 shows diagrammatically a plan view of the picture reproduction device in an alternative embodiment of the vision system according to the invention.

The picture reproduction device in FIG. 2 is assumed to be connected to the picture capture device of the kind shown in FIG. 1. It comprises a cathode-ray tube 21 with a focusing coil 22 and deflection coils 23, and a screen 24. That cathode ray tube displays the picture from a first camera device. A smaller cathode ray tube 25 is similarly arranged to display the picture from a second camera device, that last mentioned picture thus constituting a part of the picture from the first camera device. The smaller cathode ray tube 25 is arranged within its axis of symmetry 26 at right angles to the axis of symmetry 27 of the cathode ray tube 21. An opaque plane mirror 28 is arranged at an angle of 45° to the axis of symmetry 26 of the smaller cathode ray tube and is mechanically fixed relative to it as by a mechanism shown diagrammatically at 25A. The mirror 28 is of such a size that it reflects only the picture from the cathode ray tube 25. In the simplest embodiment of that picture producing means the mirror 28 is fixed with its center on the axis of symmetry 27 of the cathode ray tube 21. In that case therefore, the picture producing means always displays a picture of an object field with a smaller, central picture section that has a better sharpness in detail than the rest of the picture.

In another embodiment of the picture reproduction device according to FIG. 2, the smaller cathode ray tube 21 and the mirror 28, the latter being fixed at an angle of 45° to the axis of symmetry 26 of the cathode ray tube 25 and the two are fixed relative to one another with the mirror at an angle of 45° to the axis of a manner such that the plane of the mirror 28 always forms an angle of 45° to the axis of symmetry 27 of the cathode ray tube 21, and such that the mirror 28 can be positioned laterally as desired within the area of the screen 24. The mechanical mechanism for controlling the mirror 28 and the cathode ray tube 25 may be of any suitable type, such as through the use of thin metal wires in two coordinates. Such control is coordinated with the movements of the second camera device in the picture capture device of FIG. 1. The mirror and cathode ray tube assemblage 25A may be removed and controlled by a suitable servo mechanism 25B.

Figure 3:
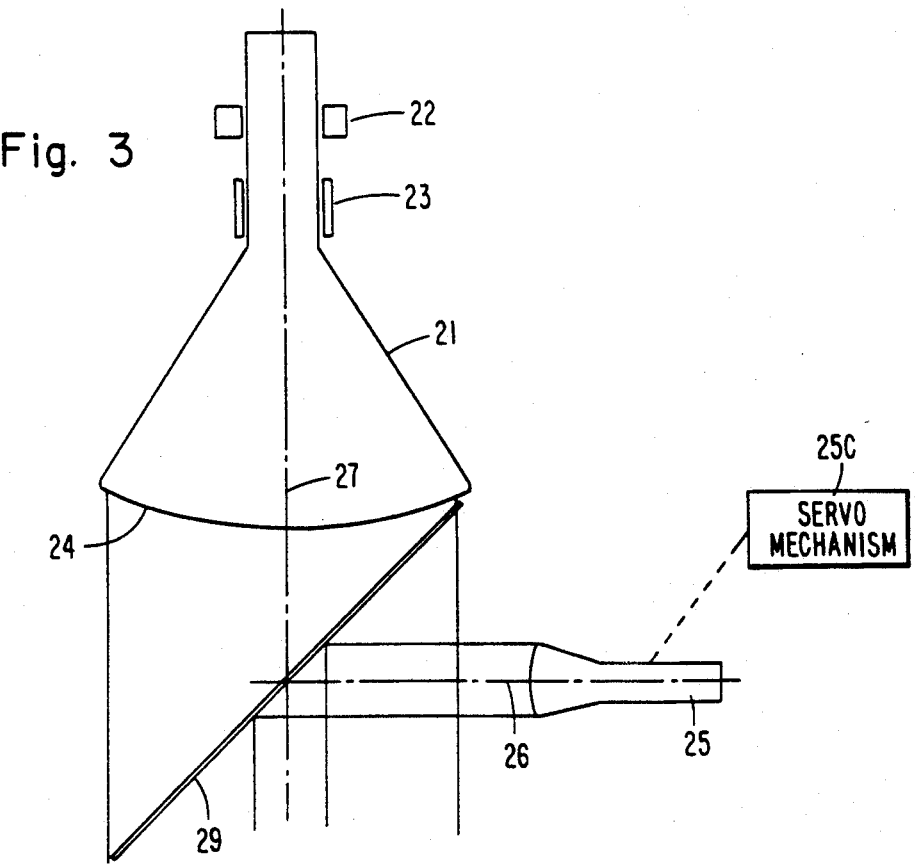
FIG. 3 shows, similarly, a variation of the picture reproduction device in FIG. 3.

The picture reproduction device in FIG. 3 comprises the same cathode ray tube 21 and a smaller cathode ray tube 25 as are shown in FIG. 2. In this embodiment there is a semi-opaque mirror 29, which is set at an angle of 45° to the axis of symmetry 27 of the cathode ray tube 21, covering the entire screen 24 when observed from the front, i.e., in the direction of the axis of symmetry 27. The cathode ray tube 25 is directed with its axis of symmetry 26 at right angles to the axis of symmetry 27 and is thus directed at an angle of 45° to the mirror 29. The cathode ray tube 25 is, with fixed orientation relative to the mirror 29, controllably movable within the reflection range of the mirror 29, coordinated with the corresponding movement of a second camera device that receives the picture shown by the cathode ray tube 25. The cathode ray tube 25 may be moved by a servo mechanism such as that indicated diagrammatically at 25C. An observer observing the picture reproduction device in the direction of the axis of symmetry 27 will therefore see that picture which is reproduced on the screen 24 through the semi-opaque mirror 29, however relatively unclearly, whereas the smaller picture from the cathode ray tube 25 will be seen with full sharpness and with the richness in detail which is the consequence of the optic construction of the second camera device.

Figure 4:
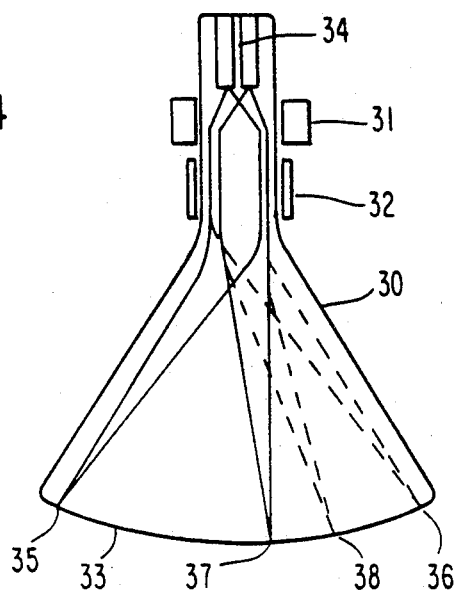
FIG. 4 shows diagrammatically a plan view of an additional embodiment of a picture reproduction device in a vision system according to the invention.

In FIG. 4 is shown a picture reproduction device that comprises a single cathode ray tube 30 with a focusing coil 31 and deflection coils 32 and a screen 33. An electron-beam generator 34 emits alternately respectively an electron beam for generating a first picture from a first camera device and an electron bean for generating a second picture from a second camera device of the kind described above, whereby both pictures therefore, due to the persistence of vision may be observed simultaneously. The picture from the first camera device, which thus shows a whole object field is indicated by ray path in the boundary positions 35, 36 whereas the picture from a second camera device, showing a section of said object field, is indicated by ray path in the boundary positions 37, 38. In this embodiment a not shown signal processing means is arranged to process the incoming signals from the first and second camera device, respectively, so that the part of the picture that is shown by the second camera device excludes the corresponding part of the picture of the first camera device. That is effected in a manner in itself known.

In FIG. 5 is shown diagrammatically an embodiment of the vision system according to the invention, where the first and second pictures are integrated electronically. In that case a first camera device 39 in the form of a video camera with, e.g., the line frequency 15,625 Hz, a 50 semi-pictures (frames)/connected to a line memory 41 from which a video signal is emitted with 6 repetitively repeated lines with the frequency 93,750 Hz. A second camera device 40 also in the form of a video camera, also with the line frequency 15,625 Hz, 50 frames/s is connected to a frame memory 42. The line memory 41 and the frame memory 42 are connected to a video gate 43, which is controlled by a gate program generator 44. A video signal is emitted from the video gate 43 to a video motor 45, with a line frequency of 93,750 Hz, 50 frames/s. The different units co-act so that during the repetitive line canning the second picture replaces the first one in the position where it is located.

A vision system of this type requires a monitor with good resolution qualities so that the resolution ability of the eye can be used. In black and white such a vision system is feasible.

Integration of the first and second pictures in an observer's brain can be effected in a vision system according to FIG. 6. In the figure the camera devices are not shown, but they are of the same type as those used in, e.g., the vision system in FIG. 1. A first picture producing means in the form of a cathode ray tube 46 reproduces the first picture in a visual picture plane 48 with the aid of optical means 53. The ray path is only diagrammatically represented. An observer can with one eye 50 via an ocular means 49 register that first picture with an extension of, e.g., 6a. A second picture producing means also in the form of a cathode ray tube 47 reproduces the second picture in the same visual picture plane 48 with the aid of optical means 54. The observer registers that second picture with the other eye 52 via an ocular means 51. Since the two pictures are being observed separately, each by an eye, they can be integrated into one picture in the observer's brain, in the same manner as when using ordinary binocular field glasses.

A vision system of this type is comparatively inexpensive, but naturally places certain demands on the observer's eyes. They must function well.

Referring to FIG. 7, there is shown an additional embodiment of a picture reproduction or display device. According to this embodiment of the invention, a first cathode ray tube 21 has a focusing coil 22, deflection coils 23 and a screen 24. This cathode ray tube displays the picture from the first camera device. A semi-opaque mirror 29 is fixed at an angle of 45° to the axis of symmetry of the cathode ray tube 21. A second cathode ray tube 55 is provided of the same size as the first cathode ray tube 21. Associated with the second cathode ray tube 55 is a second mirror 56 fixed parallel to the mirror 29. A condenser lens 57, which may be a Canon type 231085, and a field lens 58, which may also be a Canon type 231085, are disposed between the mirrors 56 and 29 to reduce the size of the second picture from cathode ray tube 55 which originated with the second camera device. Two eyepieces 59–60, (only one of which is visible in FIG. 7) allow the viewer a closer view of the pictures. These may each consist of a 250 mm objective lens 59 such as Spindler & Hoyer Type 322272 and a 4° deflection wedge plate 60, which may be a Spindler & Hoyer Type 334484. The lens reduces the accommodation strain on the eye and the wedge provides more parallelism between the lines of sight from the eyes. With this arrangement, the image of the second cathode ray screen must be rotated 180°. In this embodiment of the invention, the camera devices and picture reproduction cathode ray tubes and mirrors are fixedly related to one another with the higher resolution portion of the picture in the center of the picture field.

I claim:

1. A vision system comprising a picture capture device with at least a first camera means and a second camera means, each of which camera means include an optic means and electro-optical detection means, further comprising an electronic picture reproduction device, arranged so as to simultaneously reproduce pictures from said camera means in at least one display field, characterized in that the first camera means is arranged to register a first picture with a relatively large first viewing angle of an object field, whereas the second camera means is arranged to register a second picture, with a smaller second viewing angle within said first viewing angle of said object field, the picture reproduction device being arranged to reproduce the first picture, the second picture replacing to a pre-selected degree that part of the first picture which corresponds to said second viewing angle, whereby the first and second viewing angles have the same relative direction to the object field as in the pictures reproduced by the picture reproduction device and the relative relationship of the two viewed object fields and the corresponding two reproduction fields is the same and objects under view are reproduced to the same scale in the first and second pictures; said vision system further characterized in that the picture reproduction device comprises a first picture producing means arranged to reproduce said first picture from said first camera means and a second picture producing means arranged to reproduce said second picture from said second camera means and comprises further a mirror arranged in front of the first picture producing means reflecting the second picture from the second picture producing means.

2. A vision system according to claim 1, characterized in that the mirror is opaque.

3. A vision system according to claim 2, characterized in that the mirror is fixedly mounted with respect to the second picture producing means, both said mirror and said second picture producing means being jointly moved as a unit relative to the first picture producing means in response to and in correspondence with the movements of the second camera means.

4. A vision system according to claim 1, characterized in that the mirror 29 is semi-opaque.

5. A vision system according to claim 4, characterized in that the second picture producing means is mounted with its axis of symmetry fixed in relation to the plane of the mirror and is movable perpendicular to its axis of symmetry without the boundaries of the reflecting surface of the mirror.

6. A vision system comprising a picture capture device with at least a first camera means and a second camera means, each of which camera means include an optic means and electro-optical detection means, further comprising an electronic picture reproduction device, arranged so as to simultaneously reproduce pictures from said camera means in at least one display field, characterized in that the first camera means is arranged to register a first picture with a relatively large first viewing angle of an object field, whereas the second camera means is arranged to register a second picture, with a smaller second viewing angle within said first viewing angle of said object field, the picture reproduction device being arranged to reproduce the first picture, the second picture replacing to a pre-selected degree that part of the first picture which corresponds to said second viewing angle, whereby the first and second viewing angles have the same relative direction to the object field as in the pictures reproduced by the picture reproduction device and the relative relationship of the two viewed object fields and the corresponding two reproduction fields is the same and objects under view are reproduced to the same scale in the first and second pictures; said vision system further characterized in that the picture reproduction device comprises a first picture producing means arranged to reproduce said first picture from a first camera means and a second picture producing means arranged to reproduce said second picture from a second camera means, a display field being constituted by a visual picture plane in which the reproduced first picture is separately observable through a first ocular means with one eye of an observer and the reproduced second picture is separately observable through a second ocular means with the other eye of an observer, in such a manner that the first and second picture appear to the observer to coincide due to integration in the observer's brain.

7. A vision system comprising a picture capture device with at least a first camera means and a second camera means, each of which camera means include an optic means and electro-optical detection means, further comprising an electronic picture reproduction device, arranged so as to simultaneously reproduce pictures from said camera means in at least one display field, characterized in that the first camera means is arranged to register a first picture with a relatively large first viewing angle of an object field, whereas the second camera means is arranged to register a second picture, with a smaller second viewing angle within said first viewing angle of said object field, the picture reproduction device being arranged to reproduce the first picture, the second picture replacing to a pre-selected degree that part of the first picture which corresponds to said second viewing angle, whereby the first and second viewing angles have the same relative direction to the object field as in the pictures reproduced by the picture reproduction device and the relative relationship of the two viewed object fields and the corresponding two reproduction fields is the same and objects under view are reproduced to the same scale in the first and second pictures; said vision system further characterized in that the picture reproduction device comprises a first picture producing means arranged to reproduce said first picture from said first camera means and a second picture producing means arranged to reproduce said second picture from said second camera means, wherein said second picture reproduction means is substantially the same size as said first picture reproduction means, and a mirror arranged in front of each picture reproduction means with lens means arranged between said mirrors, and ocular means arranged adjacent the mirror in front of said first picture producing means to permit viewing by an observer.

* * * * *